(12) United States Patent
Lawler et al.

(10) Patent No.: US 7,765,632 B2
(45) Date of Patent: Aug. 3, 2010

(54) SUBSEA CONDUIT CLEANING TOOL

(75) Inventors: Kinton Lawler, Fulshear, TX (US); John Davis, Magnolia, TX (US); Ladell Lawrence, Houston, TX (US)

(73) Assignee: Oceaneering International, Inc., Houston, TX (US)

( * ) Notice: Subject to any disclaimer, the term of this patent is extended or adjusted under 35 U.S.C. 154(b) by 557 days.

(21) Appl. No.: 11/757,718

(22) Filed: Jun. 4, 2007

(65) Prior Publication Data

US 2008/0135232 A1 Jun. 12, 2008

Related U.S. Application Data

(60) Provisional application No. 60/810,951, filed on Jun. 5, 2006.

(51) Int. Cl.
*B08B 9/023* (2006.01)

(52) U.S. Cl. .................... 15/104.04; 15/88; 405/211

(58) Field of Classification Search .............. 15/88, 15/88.4, 104.04; 405/158, 171, 211, 216
See application file for complete search history.

(56) References Cited

U.S. PATENT DOCUMENTS

| | | | |
|---|---|---|---|
| 1,008,669 A | 11/1911 | Nixon | |
| 1,036,907 A | 8/1912 | Reynolds | |
| 1,134,881 A | 4/1915 | Lockwood | |
| 1,266,050 A | 5/1918 | Reynolds | |
| 1,279,732 A | 9/1918 | Lockwood | |
| 4,476,605 A * | 10/1984 | de Sivry et al. | ............... 15/179 |
| 4,676,692 A | 6/1987 | Henderson | |
| 4,688,290 A * | 8/1987 | Hogg | ................. 15/104.04 |
| 5,026,212 A * | 6/1991 | Do | ................ 405/211 |
| 5,040,923 A * | 8/1991 | Do | ................ 405/211 |
| 5,765,968 A * | 6/1998 | Lee | ................ 405/211 |
| 5,894,808 A * | 4/1999 | Miyoshi | ................ 114/222 |
| 6,798,090 B2 | 9/2004 | Cheung et al. | |
| 2009/0178216 A1 | 7/2009 | Lawler et al. | |

OTHER PUBLICATIONS

Saab Seaeye Ltd. Brochure, "Cougar XT The Compact Work ROV", 2007, 6 pages.

* cited by examiner

*Primary Examiner*—Mark Spisich
(74) *Attorney, Agent, or Firm*—Duane Morris LLP

(57) ABSTRACT

The invention is directed to a tool for cleaning subsea conduits, such as unjacketed risers or risers jacketed with strakes or other vortex induced vibration ("VIV") suppression devices.

20 Claims, 5 Drawing Sheets

SUBSEA CONDUIT CLEANING TOOL

CROSS REFERENCE TO RELATED APPLICATION

This application claims the benefit of Provisional Application Ser. No. 60/810,951, filed on Jun. 5, 2006.

BACKGROUND OF THE INVENTION

1. Field of the Invention

The invention is directed to a tool for cleaning subsea conduits, such as unjacketed risers or risers jacketed with strakes or other vortex induced vibration ("VIV") suppression devices.

2. Description of the Prior Art

Prior art devices for cleaning subsea conduits have included abrasive devices held by manipulator arms powered and positioned by a remotely operated vehicle ("ROV"). Such devices require the services of a highly skilled ROV pilot to be properly positioned and operated.

DESCRIPTION OF THE PREFERRED EMBODIMENTS

The invention is directed to a subsea conduit cleaning tool. The subsea conduit may take many forms, including but not limited to, smooth surface risers, or risers jacketed with strakes or other VIV suppression fixtures or devices.

Figure 2:
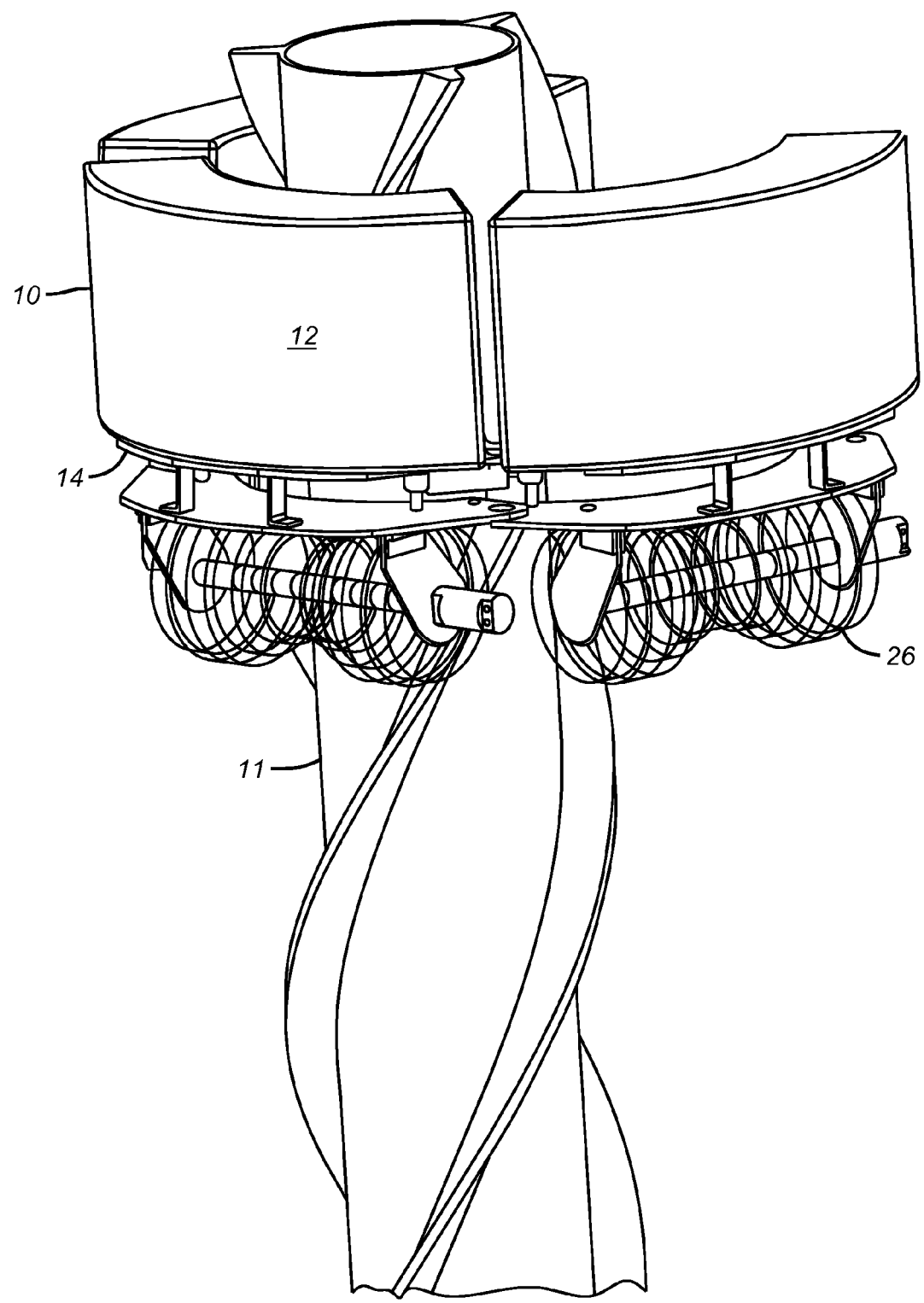
FIG. 2 is a side isometric view of an embodiment of the invention with the collar in an unclamped configuration.
Figure 3:
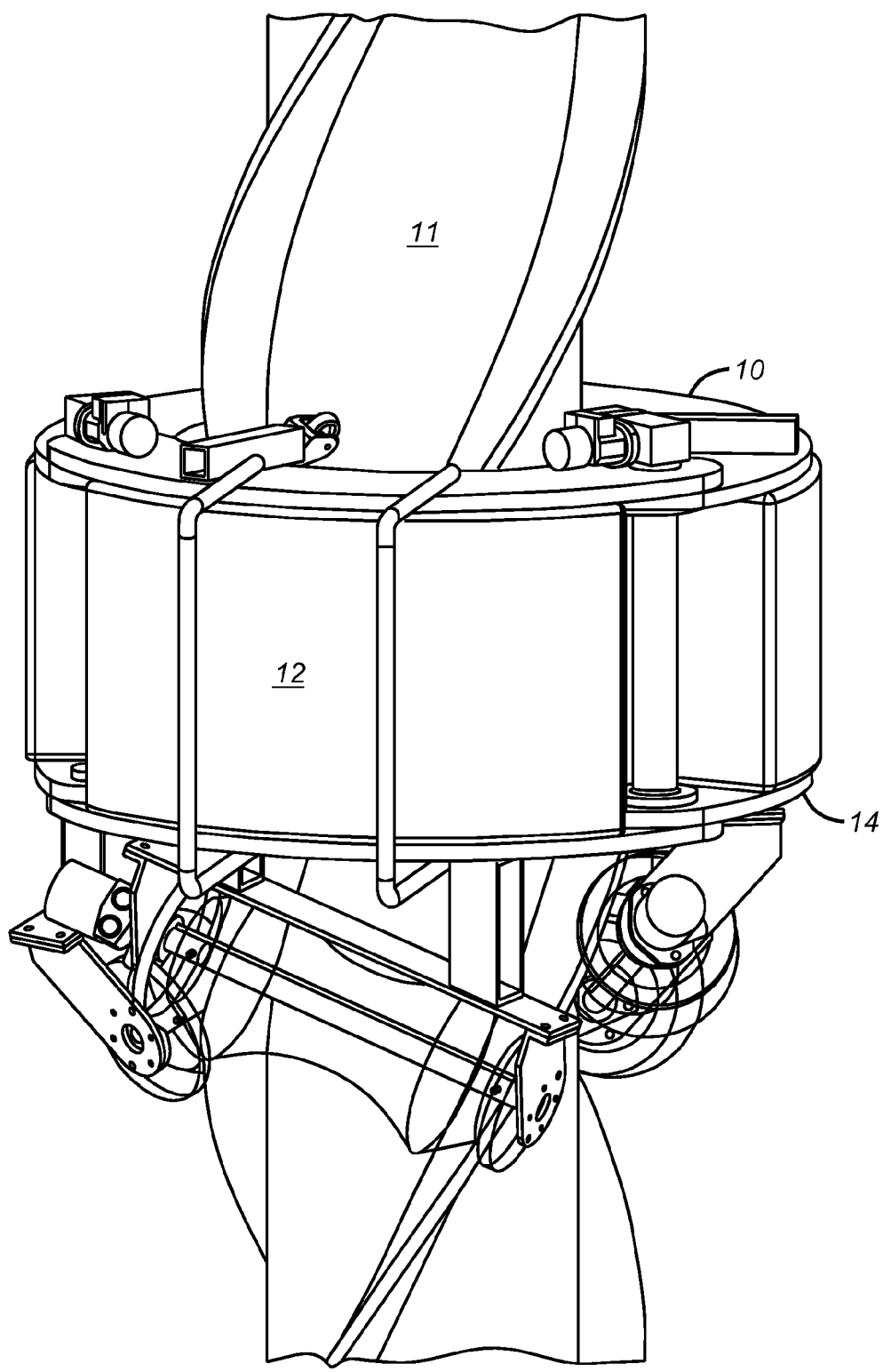
FIG. 3 is a side isometric view of an embodiment of the invention with the collar in a clamped configuration.

A first preferred embodiment of the invention is a one mounting bracket embodiment. In a first preferred embodiment, the invention comprises a clamping collar 10 sized to clamp onto a conduit 11, as shown in FIG. 2. The collar comprises buoyant material 12 and a lower plate surface 14, as shown in FIG. 3. In a preferred embodiment, the buoyant material is foam, as shown in FIGS. 2-3. In another preferred embodiment, the clamping collar is cylindrical, as shown in FIG. 2. In another preferred embodiment, the clamping collar further comprises suction cups to hold the collar to the conduit.

Figure 4:
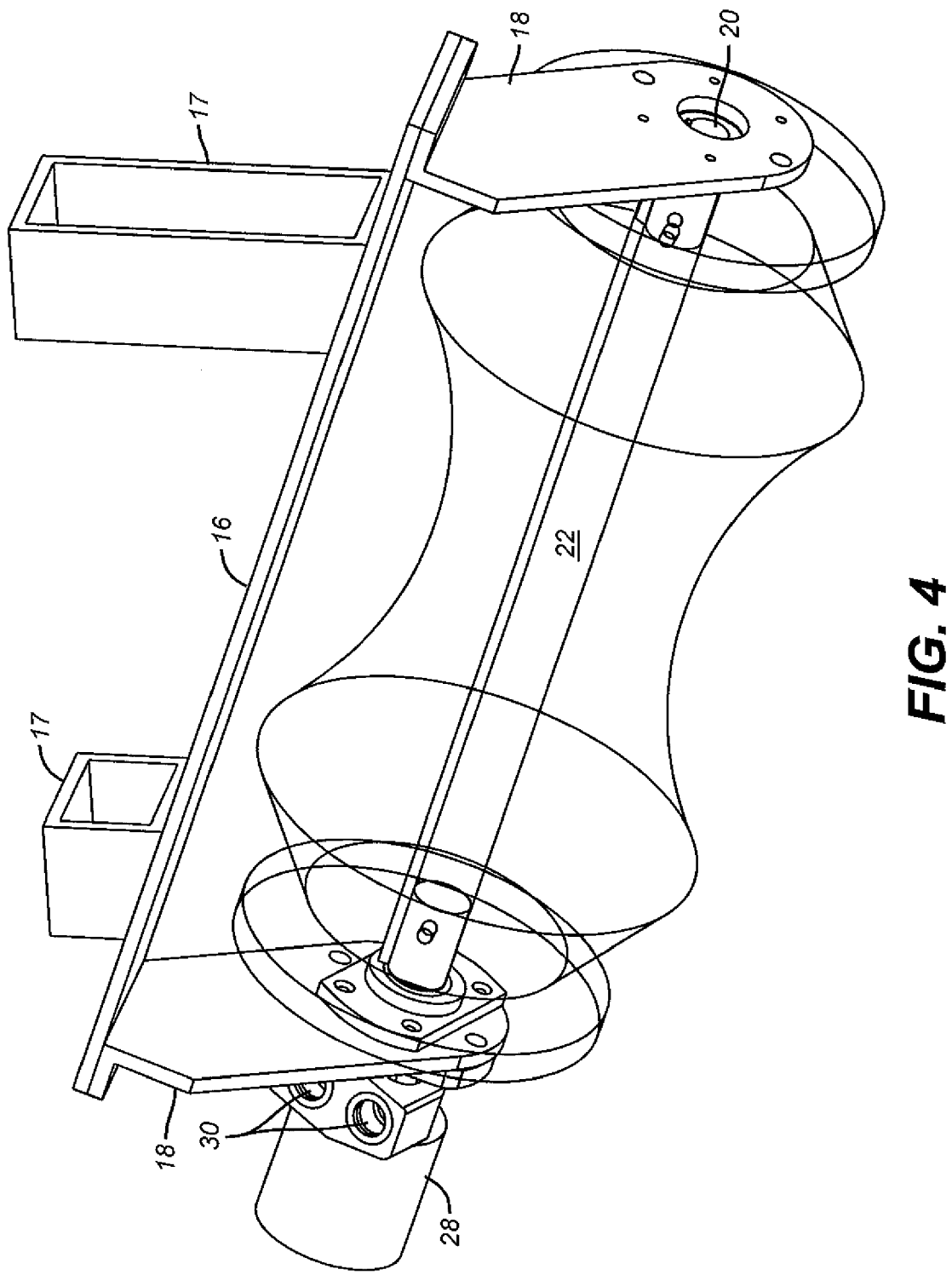
FIG. 4 is a side isometric view of a preferred embodiment of a mounting bracket which can be used in practicing the invention.

The first preferred embodiment further comprises a first mounting bracket 16 comprising a first end region, a second end region opposite the first end region and two mounting supports 17, as shown in FIG. 4. In this embodiment, the first mounting bracket is attached to the lower plate surface of the collar, and further comprises an abrasion member mounting arm 18 extending from each of its end regions, as shown in FIG. 4. In this embodiment, each of the arms comprises an axle channel 20.

In one preferred embodiment, the mounting supports 17 are of unequal length, as shown in FIGS. 3 and 4. This embodiment is particularly suitable for cleaning strakes. In another preferred embodiment, the mounting supports 17 are sized such that the first axle is mounted at an angle between 30 degrees and 60 degrees with respect to the lower plate surface of the collar, as shown in FIGS. 3 and 4. This angle is suitable for allowing the cleaning tool to follow the helical path formed by strake fins. In another preferred embodiment, the brush mounting arms are of substantially equal length, as shown in FIG. 2. This embodiment is suitable for cleaning unjacketed risers.

Figure 5:
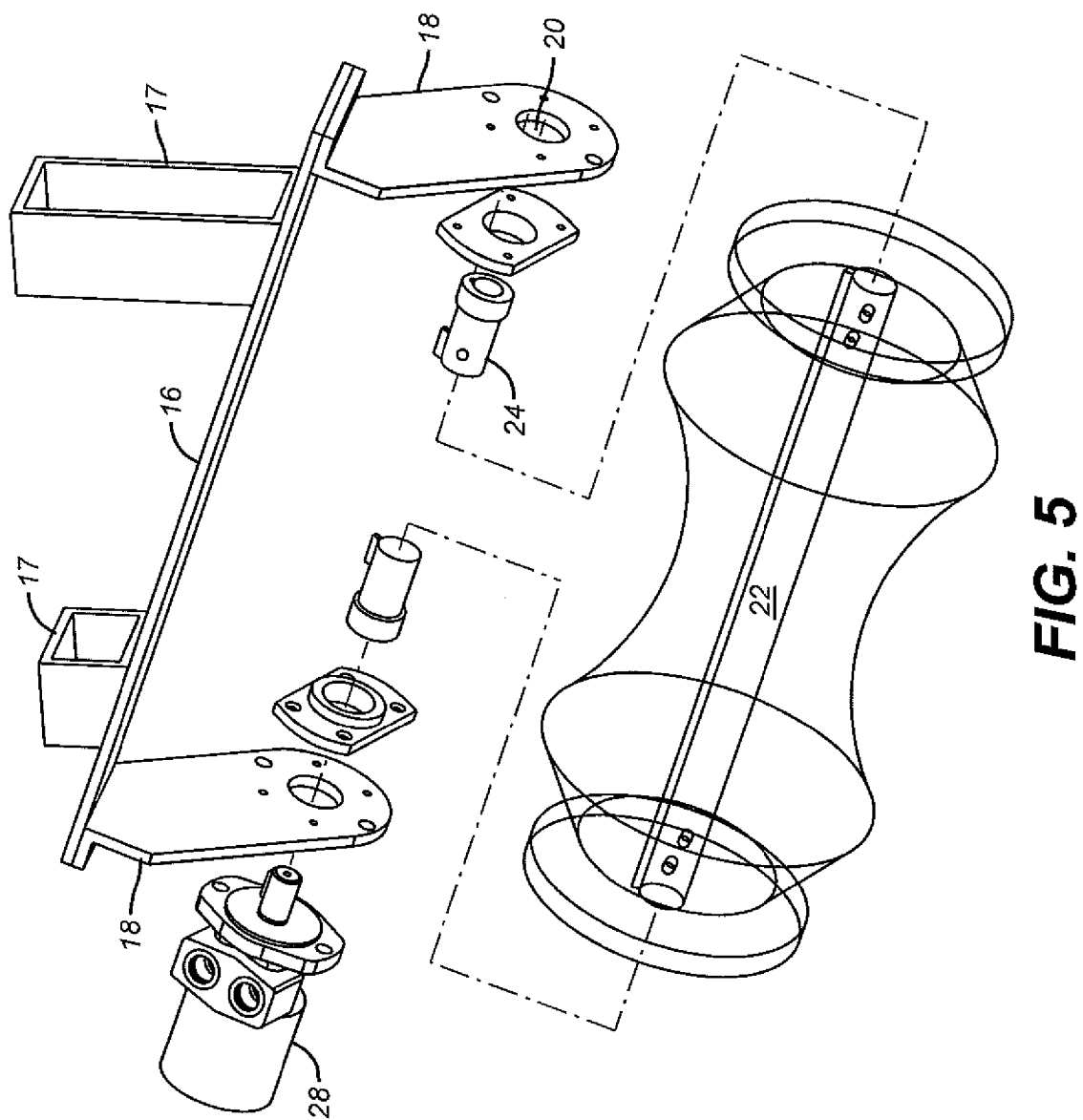
FIG. 5 is an exploded isometric view of the mounting bracket of FIG. 4.

The first preferred embodiment further comprises a first axle 22 having a first end, and a second end opposite the first end. The first axle extends between the lower arms of the first mounting bracket and is mounted in each of said axle channels, said first axle comprising an interior fluid flowpath. In one preferred embodiment, the axle contains jetting ports 24 in fluid communication with the interior fluid flowpath, as shown in FIG. 5. This provides a flowpath for fluid to be jetted onto the conduit in order to blast unwanted materials off the outer surface of the conduit. These jetting ports may also provide a propulsion system to propel the tool along the conduit when fluid is expelled under sufficient pressure through the jetting ports. In a preferred embodiment, the mounting of the axle is rotatable, as shown in FIG. 4. This rotatable mounting provides a rotary cleaning capability.

Figure 1:
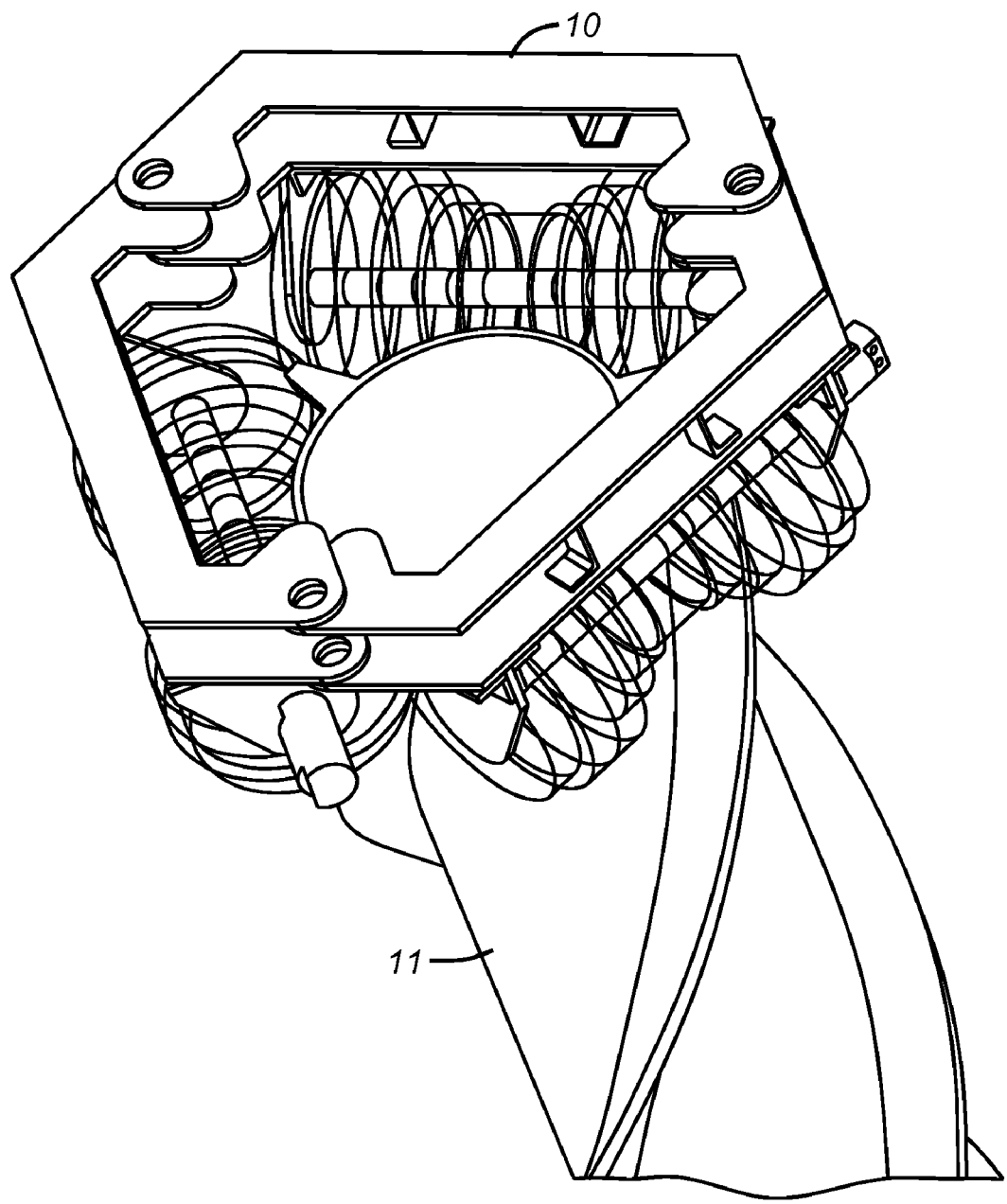
FIG. 1 is a top isometric view of an embodiment of the invention without the collar.

The first preferred embodiment further comprises an abrasion member 26 attached to the first axle, as shown in FIG. 1. In one preferred embodiment, the abrasion member is a brush. In another preferred embodiment, the abrasion member may be a scraper, or comprise a scraper, in addition to a brush. The outer diameter of the brush along the length of the axle can be varied to alter or control the magnitude of friction or abrasion between the brush and the conduit, as shown in FIG. 1. The magnitude of abrasion is proportional to the outer diameter of the brush or abrasion member.

The first preferred embodiment further comprises a first hydraulic fluid receiver 28 attached to the first end of the first axle, said receiver having two fluid ports 30, as shown in FIG. 4. One port can serve as an inlet and the other port can serve as an outlet. The fluid receiver is capable of receiving hydraulic fluid or power from an ROV.

In another preferred embodiment a hydraulic motor or hydraulic pump is mounted to the bottom plate of the collar. A conduit extends from the hydraulic motor or pump to each port of the fluid reservoir.

A second preferred embodiment of the invention is a two mounting bracket embodiment. This embodiment contains all of the elements of the first preferred embodiment, as well as a second mounting bracket having the same structural features as the first mounting bracket. The second mounting bracket is attached to the collar opposite the first mounting bracket. The second preferred embodiment comprises a second axle, a second abrasion member and second hydraulic fluid receiver having the same structure and configuration with respect to the second mounting bracket as do the fist axle, first abrasion member and first fluid receiver, respectively, with respect to the first mounting bracket.

A third preferred embodiment of the invention is a three mounting bracket embodiment. This embodiment contains all of the elements of the second preferred embodiment, as well as a third mounting bracket having the same structural features as the first and second mounting brackets. The third mounting bracket is attached to the collar opposite the first and second mounting brackets. The third preferred embodiment comprises a third axle, a third abrasion member and third hydraulic fluid receiver having the same structure and configuration with respect to the third mounting bracket as do the fist axle, first abrasion member and first fluid receiver, respectively, with respect to the first mounting bracket.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A subsea conduit cleaning tool comprising:
   a. a clamping collar sized to clamp onto a conduit, said collar comprising buoyant material and a lower plate surface;
   b. a first mounting bracket comprising a first end region, a second end region opposite the first end region, and two mounting supports, said first mounting bracket attached to the lower plate surface of the collar, and further comprising an abrasion member mounting arm extending from each of its end regions, each of said arms comprising an axle channel;
   c. a first axle having a first end, and a second end opposite the first end, said first axle extending between the mounting arms of the first mounting bracket and rotatably mounted in each of said axle channels, said first axle comprising an interior fluid flowpath;
   d. an abrasion member attached to the first axle; and
   e. a first hydraulic fluid receiver attached to the first end of the first axle, said receiver comprising two fluid ports.

2. The tool of claim 1, wherein the abrasion member is a brush.

3. The tool of claim 1, wherein the clamping collar is cylindrical.

4. The tool of claim 1, wherein the mounting supports are of unequal length.

5. The tool of claim 4, wherein the mounting supports are sized such that the first axle is mounted at an angle between 30 degrees and 60 degrees with respect to the lower plate surface of the collar.

6. The tool of claim 1, wherein said buoyant material is foam.

7. The tool of claim 1, wherein the clamping collar is clamped to a conduit.

8. The tool of claim 7, wherein the conduit is a strake.

9. The tool of claim 1, further comprising:
   a. a second mounting bracket comprising a first end region, a second end region opposite the first end region, and two mounting supports, said second mounting bracket attached to the lower plate surface of the collar, and further comprising an abrasion member mounting arm extending downward from each of its end regions, each of said arms comprising an axle channel, said second mounting bracket being attached to the collar opposite said first mounting bracket;
   b. a second axle having a first end, and a second end opposite the first end, said second axle extending between the mounting arms of the second mounting bracket and rotatably mounted in each of said axle channels, said second axle comprising an interior fluid flowpath;
   c. an abrasion member attached to the second axle; and
   d. a second hydraulic fluid receiver attached to the first end of the second axle, said receiver having two fluid ports.

10. The tool of claim 9, further comprising:
    a. a third mounting bracket comprising a first end region, a second end region opposite the first end region, and two mounting supports, said third mounting bracket attached to the lower plate surface of the collar, and further comprising an abrasion member mounting arm extending downward from each of its end regions, each of said arms comprising an axle channel, said third mounting bracket being mounted opposite said first and second mounting brackets;
    b. a third axle having a first end, and a second end opposite the first end, said third axle extending between the mounting arms of the third mounting bracket and rotatably mounted in each of said axle channels, said third axle comprising an interior fluid flowpath;
    c. an abrasion member attached to the third axle; and
    d. a third hydraulic fluid receiver attached to the first end of the third axle, said receiver having two fluid ports.

11. A subsea conduit cleaning tool comprising:
    a. a clamping collar sized to clamp onto a conduit, said collar comprising buoyant material and a lower plate surface;
    b. a first mounting bracket comprising a first end region, a second end region opposite the first end region, and two mounting supports, said first mounting bracket attached to the lower plate surface of the collar, and further comprising a mounting arm extending from each of its end regions, each of said arms comprising an axle channel;
    c. a first axle having a first end, and a second end opposite the first end, said first axle extending between the mounting arms of the first mounting bracket and rotatably mounted in each of said axle channels, said first axle comprising an interior fluid flowpath;
    d. a brush attached to the first axle; and
    e. a first hydraulic fluid receiver attached to the first end of the first axle, said receiver comprising two fluid ports.

12. The tool of claim 11, wherein the clamping collar is cylindrical.

13. The tool of claim 11, wherein the mounting supports are of unequal length.

14. The tool of claim 13, wherein the mounting supports are sized such that the first axle is mounted at an angle between 30 degrees and 60 degrees with respect to the lower plate surface of the collar.

15. The tool of claim 11, wherein said buoyant material is foam.

16. The tool of claim 11, further comprising:
    a. a second mounting bracket comprising a first end region, a second end region opposite the first end region, and two mounting supports, said second mounting bracket attached to the lower plate surface of the collar, and further comprising a member mounting arm extending downward from each of its end regions, each of said arms comprising an axle channel, said second mounting bracket being attached to the collar opposite said first mounting bracket;
    b. a second axle having a first end, and a second end opposite the first end, said second axle extending between the mounting arms of the second mounting bracket and rotatably mounted in each of said axle channels, said second axle comprising an interior fluid flowpath;
    c. a brush attached to the second axle; and
    d. a second hydraulic fluid receiver attached to the first end of the second axle, said receiver having two fluid ports.

17. A subsea conduit cleaning tool comprising:
    a. a clamping collar sized to clamp onto a conduit, said collar comprising buoyant material and a lower plate surface;
    b. a first mounting bracket comprising a first end region, a second end region opposite the first end region, and two mounting supports of unequal length, said first mounting bracket attached to the lower plate surface of the collar, and further comprising an abrasion member mounting arm extending from each of its end regions, each of said arms comprising an axle channel;
c. a first axle having a first end, and a second end opposite the first end, said first axle extending between the mounting arms of the first mounting bracket and rotatably mounted in each of said axle channels, said first axle comprising an interior fluid flowpath;
d. an abrasion member attached to the first axle; and
e. a first hydraulic fluid receiver attached to the first end of the first axle, said receiver comprising two fluid ports.

18. The tool of claim 17, wherein the abrasion member is a scraper.

19. The tool of claim 18, wherein multiple scrapers are mounted on the axle.

20. The tool of claim 19, wherein the abrasion members are not all the same size.

* * * * *